May 9, 1933.   J. KAHRS   1,907,549
METHOD OF MEASURING SPEEDS PHOTOGRAPHICALLY
Filed Jan. 7, 1929

Inventor:

Johannes Kahrs

Patented May 9, 1933

1,907,549

UNITED STATES PATENT OFFICE

JOHANNES KAHRS, OF HANOVER, GERMANY

METHOD OF MEASURING SPEEDS PHOTOGRAPHICALLY

Application filed January 7, 1929, Serial No. 330,800, and in Germany January 9, 1928.

This invention relates to a simple and useful method of measuring speed of a moving object, especially of a running motor car, by means of a photographic exposure. In contradistinction to known methods of a similar character the essential features of the present improved method reside therein that, firstly, the exposure is made by means of a photographic apparatus mounted laterally from the object concerned, being preferably definitely adjusted, and having a horizontal slot provided with a closure adapted to be moved in vertical direction in front of the sensitive layer with a known and uniform speed; and that, secondly, the moving object, the motor car or the like, is provided with a lateral mark, for instance a number plate, the length of which is known so that it is rendered possible to ascertain, by the means stated, the speed of the car etc. from the image of the mark or the like upon the photographic layer, and from the measurable torsion angle of the vertical straight lines or edges relatively to the actual position of said mark etc. by reason of the movement of the photographed car etc.

Figure 1:
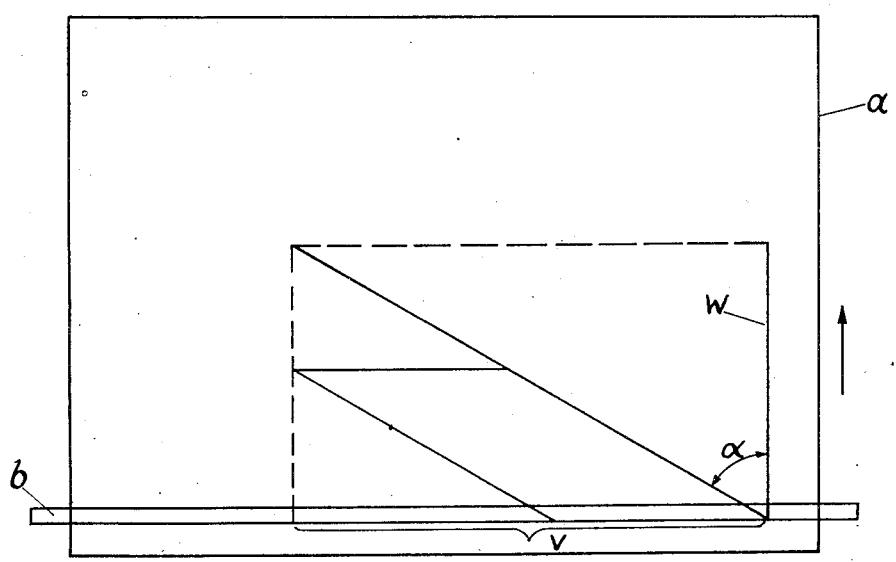
Figure 2:
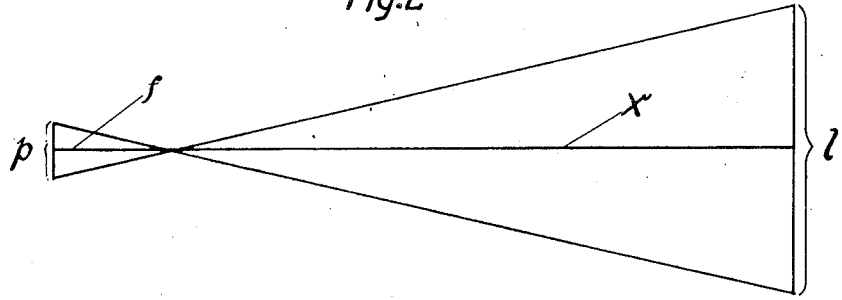

The manner in which the method can be carried out will be understood with the aid of the diagrams shown in the drawing in which Figure 1 shows the diagram obtained on the photographic layer, and Figure 2 the diagram by means of which the distance between the photographic apparatus and the moving object (motor car etc.) can be measured.

Referring to Figure 1, $a$ denotes the sensitive layer upon which the motor car etc. passing in front of it is to be photographed while the slide $b$ pertaining to the slot closure is moved in the direction of the arrow. The sensitive layer is exposed at successive points of time, and in stripes, so that while the car is running horizontally it is photographed not as a whole, but individual stripes of it appear successively upon the sensitive layer. But owing to the car being running, the stripes appearing on the sensitive layer are shifted with respect to one another so that, for instance, a vertical edge or line (bounding car line, window edge, ornamenting line, or the like) appears as if having been turned relatively to its original position by an angle corresponding to the speed $v$ of the car and the speed $w$ of the slot closure and being dependent upon these speeds, as well as upon the distance $x$ of the apparatus from the moving object (car). As the speed $w$ of the slot closure is known, and kept unvaried, the speed $v$ of the moving object (running car) can be ascertained merely from the shifting angle $a$, the known speed $w$ of the closure, and the distance $x$.

Also this distance can be ascertained by the photographic exposure, as the moving object is provided with a plate of known length $l$ (Fig. 2), and as the focal distance of the objective is known, the length $p$ of the plate appearing upon the photography presents a measure for ascertaining the unknown distance $x$ according to the proportion $p:l=f:x$.

Therefore, the two values to be read from the photography, viz. the value $a$ of the shifting angle and the value $p$ of the plate image, are those ascertained and fixed by the exposure, and with the aid of these values the speed $v$ of the moving object can be read easily and quickly for instance from previously prepared tables.

This improved method has considerable practical importance in that it is extremely simple and completely reliable, and as the values by means of which the speed has been ascertained have been obtained and fixed photographically, or mechanically respectively, and as, furthermore, the photograph has the character of a deed, sources of faults as lie in the uncertainty of human calculations and estimations are absolutely obviated.

Providing, for instance, motor cars at their sides with a plate of a certain definite length and bearing a recognizing mark can be easily enforced by an order of the traffic police.

I claim:

The photographic method of measuring the speed of a moving object, which method comprises providing the object with a mark of known length, moving a horizontal slot of a camera shutter vertically with uniform speed while said marked object is moving past the light-sensitive surface of the camera, and opening and closing said slot intermittently during that time so as to obtain on the sensitive surface separate stripes located above one another and shifted relatively to one another, the distance between said stripes and the angle of shifting between them constituting the basis for determining the speed of said object.

In testimony whereof I affix my signature.

JOHANNES KAHRS.